(12) United States Patent
Geiger et al.

(10) Patent No.: US 6,775,536 B1
(45) Date of Patent: Aug. 10, 2004

(54) METHOD FOR VALIDATING AN APPLICATION FOR USE IN A MOBILE COMMUNICATION DEVICE

(75) Inventors: Robert L. Geiger, Redwood City, CA (US); Jyh-Han Lin, Coral Springs, FL (US); James E. Van Peursem, Spring Grove, IL (US); Avinash C. Palaniswamy, Austin, TX (US); Ambiga Subramanian, Schaumburg, IL (US); Anna Battenhouse, Austin, TX (US)

(73) Assignee: Motorola, Inc, Schaumburg, IL (US)

( * ) Notice: Subject to any disclaimer, the term of this patent is extended or adjusted under 35 U.S.C. 154(b) by 0 days.

(21) Appl. No.: 09/705,982

(22) Filed: Nov. 3, 2000

Related U.S. Application Data
(60) Provisional application No. 60/163,361, filed on Nov. 3, 1999.

(51) Int. Cl.[7] .................................................. H04Q 7/20
(52) U.S. Cl. ........................ 455/411; 713/175; 455/410
(58) Field of Search ................................. 455/411, 445, 455/410; 713/200, 201, 175, 155, 176, 156, 160, 178, 165, 193; 717/165; 709/217, 219, 246, 250, 203, 229, 232; 380/231, 30, 255, 270; 370/351, 353

(56) References Cited

U.S. PATENT DOCUMENTS

| | | | | |
|---|---|---|---|---|
| 6,092,194 A | * | 7/2000 | Touboul | 713/200 |
| 6,253,326 B1 | * | 6/2001 | Lincke et al. | 713/201 |
| 6,334,056 B1 | * | 12/2001 | Holmes et al. | 455/445 |
| 6,421,781 B1 | * | 7/2002 | Fox et al. | 713/201 |
| 6,477,565 B1 | * | 11/2002 | Daswani et al. | 709/217 |
| 6,480,962 B1 | * | 11/2002 | Touboul | 713/200 |
| 6,493,870 B1 | * | 12/2002 | Madany et al. | 717/165 |
| 6,609,199 B1 | * | 8/2003 | DeTreville | 713/172 |
| 6,714,778 B2 | * | 3/2004 | Nykanen et al. | 455/414.1 |
| 2002/0087655 A1 | * | 7/2002 | Bridgman et al. | 709/217 |

* cited by examiner

*Primary Examiner*—Jean Gelin
(74) *Attorney, Agent, or Firm*—Scott M. Garrett

(57) ABSTRACT

A wireless domain (602) sets a security policy for all mobile communication devices (606) within the domain by use of a system entry proxy server (604). A developer makes an application or code segment available at a developer station (600). The application is certified by a certificate defining a developer security setting. The user of the mobile communication device initiates a download of the application so that it can be installed onto the mobile communication device. The application is downloaded through the system entry proxy server which authenticates the application, then re-certifies it with a compact certificate including an operator defined security policy. In this way the operator can control which resources of the mobile communication device are accessed by all applications coming into the wireless domain.

3 Claims, 7 Drawing Sheets

METHOD FOR VALIDATING AN APPLICATION FOR USE IN A MOBILE COMMUNICATION DEVICE

CROSS REFERENCE TO RELATED APPLICATIONS

This application claims the benefit of U.S. Provisional Application No. 60/163,361, filed, Nov. 3, 1999 and assigned to Motorola, Inc.

FIELD OF THE INVENTION

The present invention relates to a method and system for reducing time and power requirements for executing computer-readable instruction, such as an application, in an execution environment having run-time security constraints. More particularly, the invention pertains to a method of re-certifying an application so that the security level can be dictated by the operator of a domain in which the target device operates.

BACKGROUND OF THE INVENTION

The Java™ programming and execution environment, created by Sun Microsystems, provides a popular way to write, distribute, and execute programs for many platforms. One of the attractive features in the Java™ execution environment is the built-in security system that enforces a set of security constraints on every program executed while in the execution environment. Through this mechanism, an execution environment can safely execute Java™ programs from unknown origins without risk of the program having adverse affects on the execution environment.

The enforcement of these security constraints places an added burden on the execution environment to execute the built-in security system because the set of security constraints is performed every time a class file is loaded into the execution environment, thus increasing time and power requirements. It is important to note that platforms with limited computing resources are especially sensitive to this added burden. For example, these security constraints are particularly troublesome in environments, such as web browsers, where computer-readable instruction streams are downloaded to the execution environment, but not permanently stored in the execution environment. Since the computer-readable instruction streams are not permanently stored in the execution environment, they have to be downloaded each time they are accessed, which adds the requirement for the verification process to be performed each time the computer-readable instruction streams are downloaded in the execution environment.

Furthermore, in the present art when a client device downloads an application or code segment, the application or code segment is authenticated only by the client device. Thus, the developer of the code dictates the security level of the application, which resources it can access, and so on. This is undesirable in some situation such as where a private fleet of mobile communication devices contain proprietary information, and the operator of the domain in which the mobile communication devices operate may which to restrain the security setting to prevent access to certain sensitive data objects normally existing on the mobile communication devices.

Thus, there exists a need for a method and apparatus that reduces the time and power requirements for executing computer-readable instruction streams in the execution environment having run-time security constraints while maintaining the safety of the execution environment executing computer-readable instruction streams from unknown origins without risk of the computer-readable instruction streams having adverse affects on the execution environment. Furthermore there exists a need to allow the operator of a domain in which the target devices operate to control the security settings of all applications entering that domain.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

A method and system that reduces the time and power requirements for executing computer-readable instruction streams in an execution environment having run-time security constraints, while maintaining the safety of the execution environment executing computer-readable instruction streams from an unknown origin without risk of the computer-readable instruction stream having adverse affects on the execution environment is described herein. The preferred embodiment of the present invention is applicable to any execution environment having run-time security constraints, including the Java™ Virtual Machine created by Sun Microsystems, Inc.

Figure 1:
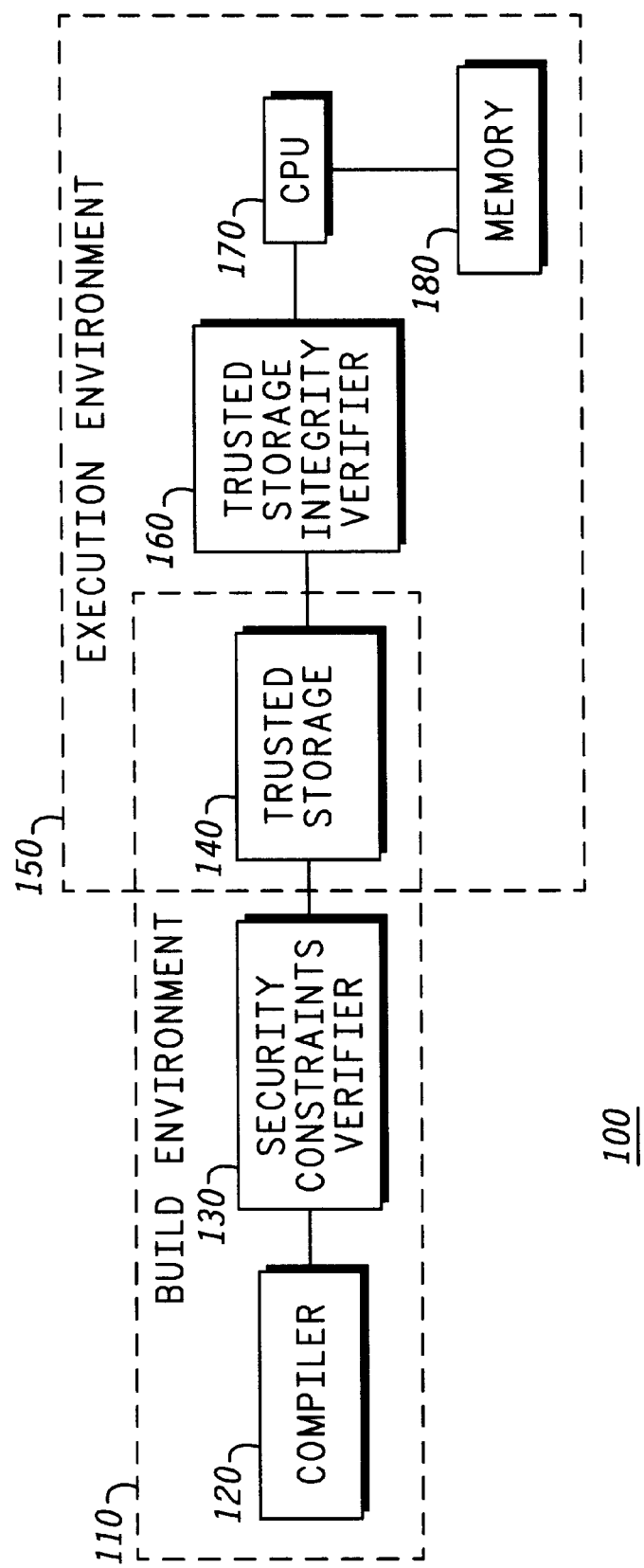
FIG. 1 is a block diagram of a system according to the preferred embodiment of the present invention.

FIG. 1 illustrates a system 100 for reducing time and power requirements for executing computer-readable instruction streams in an execution environment 150 having run-time security constraints. The system 100 comprises a build environment 150 and an execution environment 150.

The build environment 110 of the system 100 comprises a compiler 120 and a security constraints verifier 130. The compiler 120 creates a computer-readable instruction stream. The security constraints verifier 130, coupled to the compiler 120, verifies that the computer-readable instruction stream does not violate the run-time security constraints of the execution environment 150. The run-time security constraints are execution environment specific. For example, in the specific case of Java™ programming, the verification tool performs the class file and/or bytecode verification process, which is a multi-pass process with each pass performing a specific set of checks. In the first pass, the basic structural integrity of the class file is checked. In a second pass, a series of checks are made for simple problems, such as invalid constant pool items or incorrect object inheritance problems. In a third pass, data-flow analysis is performed on each method in the code so that regardless of what path is taken through the method, a set of constraints always hold. These constraints include the sizes of operand stacks, which must not grow beyond system limits, and the number and types of arguments in which the methods are invoked. In addition, there are a series of checks that can be performed either in conjunction with the third pass, or optionally in a fourth pass, that include violations to language-level security restrictions, assignment of objects to mismatched field types, and verification that methods being called actually exist.

Preferably, a "trusted" storage 140 is shared between the build environment 110 and the execution environment 150. The "trusted" storage 140 is coupled between the security constraints verifier 130 in the build environment 110 and a "trusted" storage integrity verifier 160 (described in detail below) in the execution environment 150. The "trusted" storage 140 stores the computer-readable instruction stream such that it cannot be modified without detection. It should be noted that the "trusted" storage 140 can subsequently be moved to any other suitable location within the system 100, such as a server 200 (described in detail below with reference to FIG. 2). Some examples of a "trusted" storage 140 are a read-only memory (ROM) or an archive with a digital signature attached. In the context of Java™ programming, a Java™ Archive (JAR) file can be used as a "trusted" storage 140. Those skilled in the art will recognize a number of other mechanisms that can be used for the "trusted" storage mechanism within the scope and spirit of the present invention. The execution environment 150 is, but not limited to, a normal central processing unit (CPU) or a byte-code interpreted environment.

The execution environment 150 of the system 100 comprises a "trusted" storage integrity verifier 160, a CPU 170 and a memory 180. The CPU 170 is coupled to the "trusted" storage integrity verifier 160 and the memory 180 is coupled to the CPU 170. Before the execution environment 150 executes the computer-readable instruction stream, the execution environment 150 retrieves the computer-readable instruction stream from the "trusted" storage 140 and the "trusted" storage integrity verifier 160 verifies the integrity of the "trusted" storage 140 to insure that the computer-readable instruction stream has not been modified after being placed in the "trusted" storage 140.

If the integrity of the "trusted" storage 140 cannot be verified, it is assumed that the computer-readable instruction stream has been modified after being placed in the "trusted" storage 140, and needs to be re-verified of the conformity to the run-time security constraints before execution in the execution environment 150. If the integrity of the "trusted" storage 140 is verified (i.e., the computer-readable instruction stream has not been modified since stored in the "trusted" storage 140), the computer-readable instruction stream is executed without additional verification of the run-time security constraints.

When the CPU 170 executes the computer-readable instruction stream, the verification of the run-time security constraints are bypassed. Bypassing verification of the run-time security constraints of the computer-readable instruction stream in the execution environment 150, after determining that the computer-readable instruction stream has not been modified after being placed in the "trusted" storage 140, reduces time and power requirements for the execution environment 150 while still retaining a high level of security.

Figure 2:
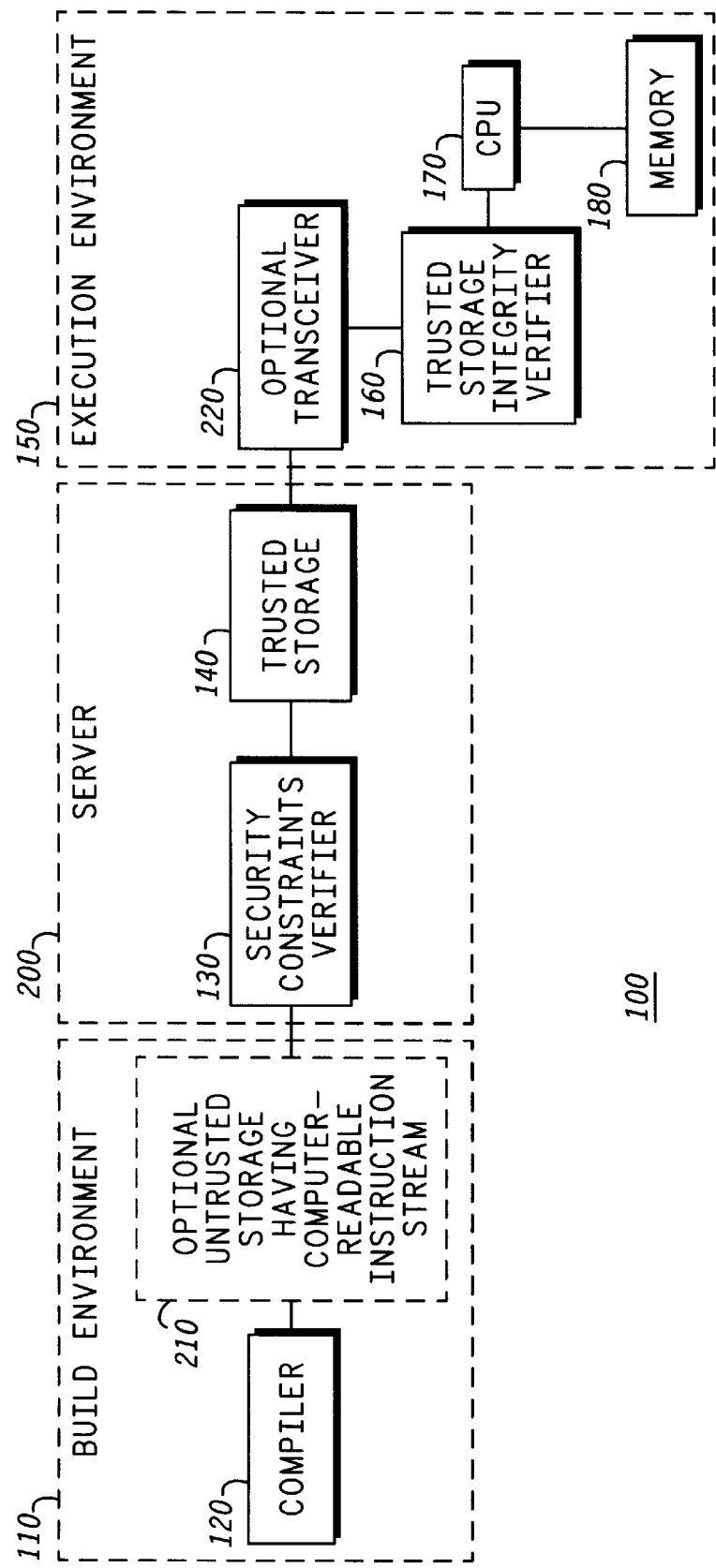
FIG. 2 is a block diagram of the system according to an alternative embodiment of the present invention.
Figure 3:
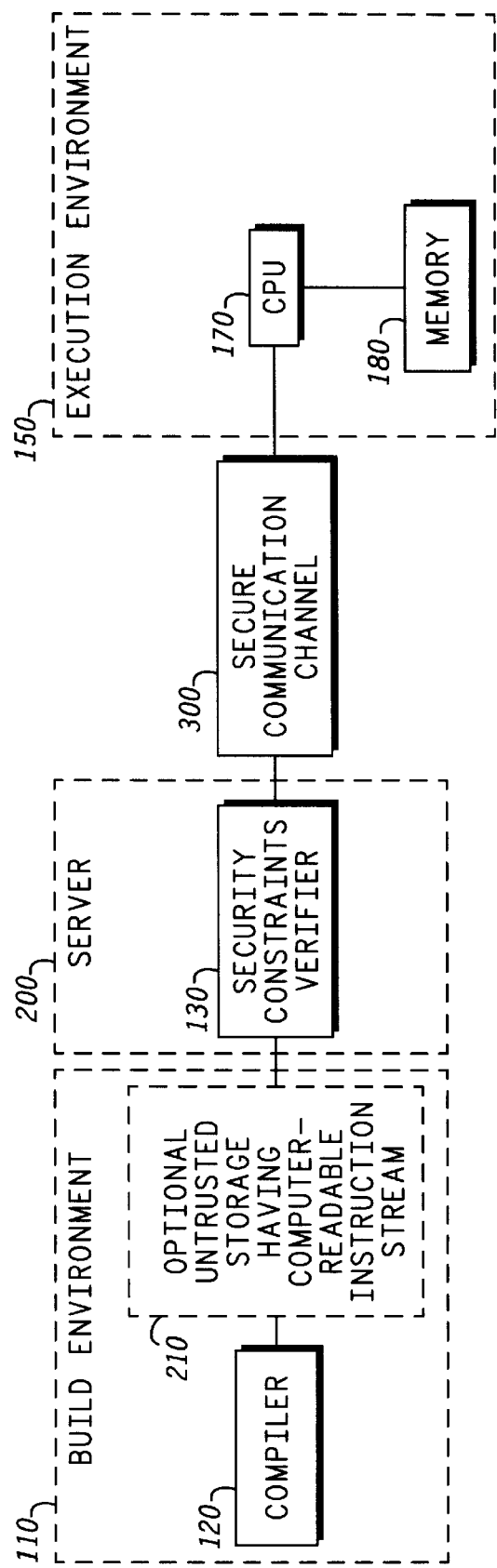
FIG. 3 is a block diagram of the system according to a further alternative embodiment of the present invention.

Alternatively, the system 100 can comprise a server 200 as illustrated in FIG. 2. In such a configuration, the compiler 120 remains located in the build environment 110 and the security constraints verifier 120 and the "trusted" storage 140 are located on the server 200. The server 200 can send the "trusted" storage 140 to the execution environment 150 for execution of the computer-readable instruction stream, or alternatively, as shown in FIG. 3, the server 200 can send the computer-readable instruction stream directly to the execution environment 150 via a secure communications channel 300.

The build environment 110 can optionally comprise an "untrusted" storage 210 for storing the computer-readable instruction stream prior to determining if the computer-readable instruction stream violates the run-time security constraints of the execution environment 150.

Further, the execution environment can optionally comprise a transceiver 220 for requesting the retrieval of the computer-readable instruction stream from the server 200 and receiving the computer-readable instruction stream after is passes verification of the run-time security constraints.

Figure 4:
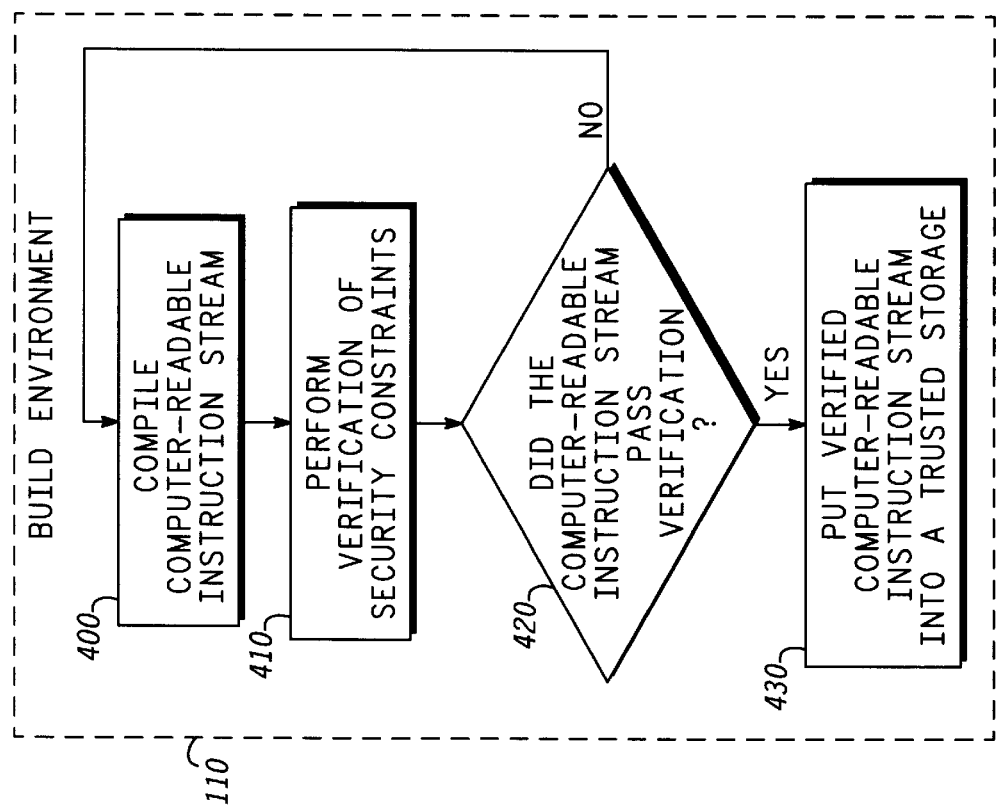
FIG. 4 is a flow chart of the build environment according to the preferred embodiment of the present invention.

FIG. 4 illustrates a flow chart representing a method of the present invention at the build environment 110. In operation, a programmer creates a computer-readable instruction stream in a usual fashion (e.g., editing source files and compiling the computer-readable instruction stream with a compiler) at step 400.

After the computer-readable instruction stream is created at step 400, a verification tool is used to perform all of the necessary security checks for the security constraints of the system 100 at step 410. Some of the security checks for the security constraints of the system 100 include checking access to regions of memory in the execution environment 150, checking access to files in the execution environment 150 and checking that a resource requirement does not exceed a limitation of the execution environment 150 (e.g., that the computer-readable instruction stream does not allocate more memory than is available in the execution environment).

After performing the steps of verification at step 410, it is determined whether the computer-readable instruction stream passes verification at step 420. If it is determined that the computer-readable instruction stream does not pass verification at step 420, then the computer-readable instruction stream is discarded and a new computer-readable instruction stream is created at step 400. If it is determined that computer-readable instruction stream passes verification at step 420, then it is preferably stored in the "trusted" storage 140 at step 430, thus indicating that the computer-readable instruction stream will pass bytecode verification when executed in an execution environment 150.

It is important to note that step 430 is preferable, but is not required. Once it is determined at step 420 that the computer-readable instruction stream passes verification, it can be sent to the execution environment 150 for execution. Preferably, however, as shown in FIG. 4, once the computer-readable instruction stream passes verification at step 420, it is stored in a "trusted" storage 140 for later retrieval by the execution environment 150. One of the primary advantages of storing the computer-readable instruction stream in the "trusted" storage 140 after passing verification is that if the computer-readable instruction stream remains unmodified while in the "trusted" storage 140 (determination that the computer-readable instruction stream has not been modified is described below), the execution environment 150 can retrieve and execute it multiple times without requiring the execution environment 150, or any other suitable environment or medium, to perform further verification of security constraints.

Preferably, the verification tool is implemented as a part of the build environment 110, in that the verification of all of the necessary security checks for the security constraints of the system 100 are automatically done as a part of building the computer-readable readable instruction stream. For example, the compiler 120 performs the verification step (step 410) automatically after compiling a program (step 400). In a further example, if the present invention is applied in the context of Java™ programming, the verification step (step 410) can be performed when creating a Java ™ Archive (JAR) file.

The verification tool can also be implemented as a stand-alone tool such that verification of all of the necessary security checks for the security constraints of the system 100 are performed by a third party to an already existing computer-readable instruction stream. For example, a cellular network operator uses a tool to perform the verification steps on a computer-readable instruction stream before making it available for distribution to the customers on its network.

Further, the verification tool can also be implemented in a server 200, such that the verification of all of the necessary security checks for the security constraints of the system 100 are performed prior to the computer-readable instruction stream being transferred to the execution environment 150 as illustrated in FIG. 2. For example, the computer-readable readable instruction stream is compiled and stored into an "untrusted" storage 210 at the build environment 110. The contents of the "untrusted" storage 210 is subsequently transferred and stored on the server 200 until the execution environment 150 requests retrieval of the computer-readable instruction stream. Once the server 200 receives a request from the execution environment 150 to retrieve the computer-readable instruction stream, the server 200 uses the verification tool to perform all of the necessary security checks for the security constraints of the system 100 on the computer-readable instruction stream before delivery to the execution environment 150. If the computer-readable instruction stream passes verification, it is delivered to the execution environment 150 and preferably stored in the "trusted" storage 140 for later use. As long as the computer-readable readable instruction stream remains unmodified in the "trusted" storage 140, it bypasses future verification of the run-time security constraints when requested by the execution environment 150 in the future without risk of the computer-readable instruction stream having adverse affects on the execution environment 150.

It should be noted that the computer-readable instruction stream can be verified by the server 200 and placed in the "trusted" storage 140 prior to receiving a request from the execution environment 150. As such, the execution environment 150 verifies the integrity of the "trusted" storage 140 and retrieves the computer-readable instruction stream from the "trusted" storage 140 directly.

An alternative to automatically transferring and storing the computer-readable instruction stream on the server 200, the computer-readable instruction stream could remain in the "untrusted" storage 210 on the build environment 110, or any other suitable location, until requested by the execution environment 150. After the execution environment 150 requests the computer-readable instruction stream from the server 200, the server 200 retrieves the computer-readable instruction stream from the "untrusted" storage 210 and verifies that the computer-readable instruction stream does not violate the security constraints of the execution environment 150. Once the computer-readable instruction stream successfully passes verification, the computer-readable instruction stream is transferred to the execution environment 150. Preferably, the computer-readable instruction stream is also placed in a "trusted" storage 140 after passing verification in order to bypass future verification of the run-time security constraints when requested by the execution environment 150 in the future without risk of the computer-readable instruction stream having adverse affects on the execution environment 150.

Figure 5:
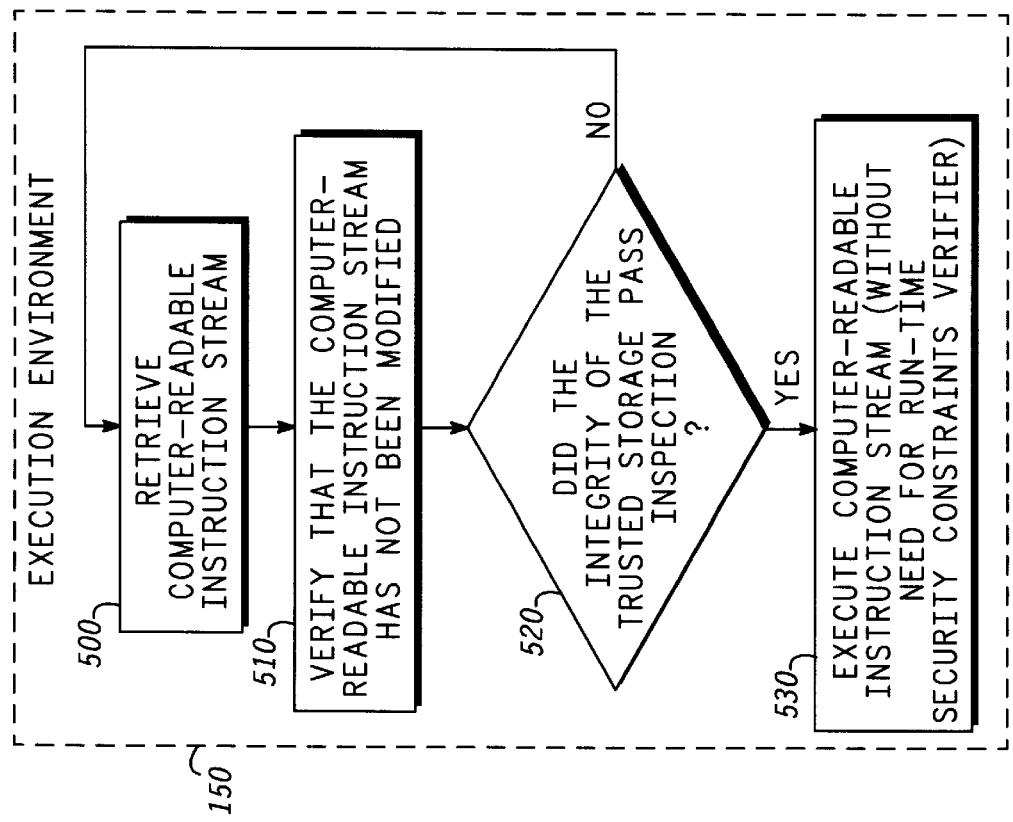
FIG. 5 is a flow chart of the execution environment according to the preferred embodiment of the present invention.

FIG. 5 illustrates a flow chart representing a method of the present invention in the execution environment 150. In operation, an execution environment 150 retrieves the "trusted" storage 140, if the "trusted" storage 140 is located remotely from the execution environment 150, having the computer-readable instruction stream. The execution environment 150 then verifies the integrity of the "trusted" storage 140 (i.e., verify that the computer-readable instruction stream has not been modified after passing all of the necessary security checks for the security constraints of the system). For example, if the "trusted" storage 140 is an archive with a digital signature or message digest attached, the archive is retrieved by the execution environment 150 in step 500 and the digital signature or message digest is checked for authenticity using cryptographic techniques, or any other appropriate techniques, as known in the art to verify that the computer-readable instruction stream in the archive has not been modified at steps 510 and 520.

If the computer-readable instruction stream is sent through a secure communication channel 300, such as a secure sockets layer (SSL), the secure communication channel 300 can detect if the computer-readable instruction stream has been modified while in the secure communication channel 300 using cryptographic techniques, or any other appropriate techniques, as known in :the art. Therefore, the explicit step of verifying that the computer-readable instruction stream has not been modified (step 510) performed within the secure communication channel 300 and the explicit step of verifying the integrity of the trusted storage (step 520) is not applicable.

For some "trusted" storages 140, however, verification of the "trusted" storage 140 is not necessary. For example, a ROM is inherently "trusted" because the computer-readable readable instruction stream cannot be modified once stored (i.e., it is a write-once memory). As a result, if the execution environment 150 retrieves the computer-readable instruction stream from a ROM, the execution environment bypasses steps 510 and 520 and executes the computer-readable instruction stream upon retrieval at step 530. Thus, steps 510 and 520 are not required when the "trusted" storage 140 is a ROM, or any other mechanism (e.g., write-once memories or mechanisms) that is inherently "trusted" because its contents cannot be modified once stored.

If the integrity of the "trusted" storage 140 passes verification at step 520, the system 100 knows that the computer-readable instruction stream located in the "trusted" storage 140 has previously passed the security verification process and has not been modified since such verification. As a result, the run-time security checks do not need to be performed on the computer-readable instruction stream prior to execution of the computer-readable instruction stream at step 530. The computer-readable instruction stream is therefore executed without these security checks, which is much more power and time efficient.

Figure 6:
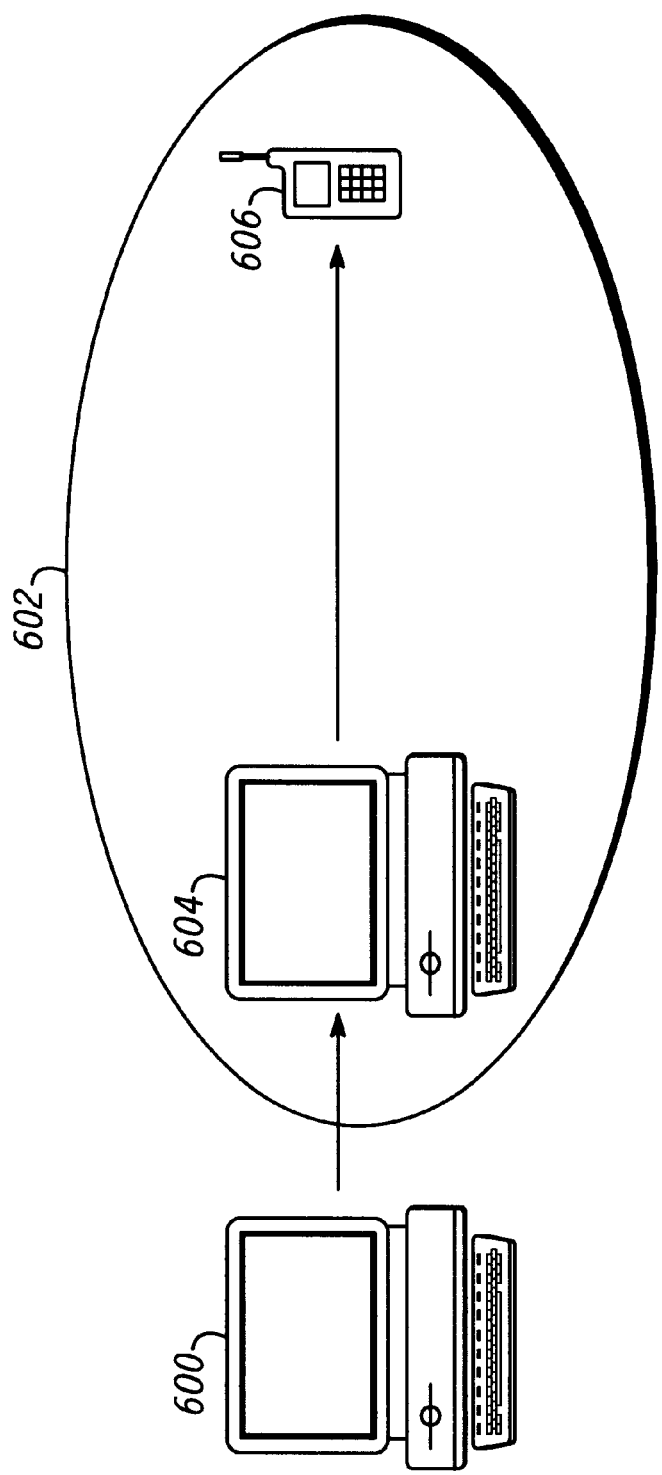
FIG. 6 is a system diagram of a wireless system with a proxy server to re-certify code, in accordance with the invention.

Referring now to FIG. 6, there is shown therein a system diagram of a wireless system with a proxy server to re-certify code, in accordance with the invention. There is provided a developer station 600 which is where a developer builds code and makes it available to other parties. It may be similar to the build environment 110 described herein above. The developer station is part of a public key infrastructure and signs applications such as Java code, JAR files, Java applets, Java beans, and so on. This type of application is generally provided in the form of portable code such as byte code which can be validated. A wireless domain 602 is the domain over which the wireless system operator establishes a security policy, and it includes a system entry proxy server 604 and a mobile communication device 606. By security policy it is meant the general security setting that will be attributed to applications and code coming into the domain from outside the domain. This is controlled by use of the system entry proxy server. The wireless system, as it will be appreciated by those skilled in the art, also typically comprises fixed equipment such as base stations for establishing serving cells, and mobile switching centers for facilitating communication processing, as is well known in the art. The mobile communication device is device comprising a processor, display, user interface, audio circuits, and so on. It may be, for example, capable of facilitating telephone calls or other voice communication. It may also be a device less like conventional communication devices, such as a personal digital assistant or organizer, for example. The mobile communication device has an execution environment for executing applications. He execution environment may be invoked by other software installed on the mobile communication device, such as a microbrowser. The mobile communication device is also provided with means for establishing a client-server communication session over a network. In a preferred embodiment the mobile communication device uses standard TCP/IP networking. Since the mobile communication device is operating in a wireless domain, the mobile communication device is capable of establish a network connection over an air interface facilitated by a fixed equipment network, as is well known in the art.

When a user desires to load an application onto the mobile communication device, the system entry proxy server plays a key role in the transfer of the application from the developer station to the mobile communication device. The system entry proxy server is the gateway between the wireless domain and the Internet, for example. It performs two functions. First, it uses a validation tool to validate an application, as described hereinabove. In this respect it acts as a security constraints verifier. Second it performs a higher level authentication using public key technology and digital certificates. It is intended that an application developed at a developer station will have an associated authentication means such as a digital certificate. The system entry proxy server posses the public keys of trusted sources such as certificate authorities, and example of which is Verisign, Inc. Using public key cryptography techniques, the system entry proxy server can verify the authenticity of an application or application archive. Since standard public key certificates are not suitable for resource limited devices such as mobile communication devices, the system entry proxy server can re-certify the application using a compact certificate more suitable for a resource limited device. It may also include a security policy in the compact certificate. Thus, the system entry proxy server can control the security level of all applications passing into the wireless domain 602. Even if the developer has set a security level, the use of the system entry proxy server allows the operator of the wireless system to control the security settings of all application passing into the wireless domain.

Thus, the invention includes a method for validating an application for use in a mobile communication device. That method comprises receiving a request for the application from the mobile communication device at the system entry proxy server. This occurs once the user of the device decides to load an application, or perhaps automatically. The user uses the mobile communication device's networking resources to browse content placed on servers connected to, for example, the Internet. This is done through the proxy server, which is transparent to the user. Once the user finds an application that he or she wishes to install on the mobile communication device, the mobile communication device is operated to generate the request. Once the system entry proxy receives the request, it forwards the request to the developer station. The developer station responds by transmitting the application to the mobile communication device through the proxy server. The proxy server receives the application from the developer station, and authenticates the application. It may also perform a byte code validation, if desired. The proxy server then commences with re-certifying the application with a compact certificate suitable for use in the mobile communication device, thereby producing a re-certified application, and forwarding the re-certified application to the mobile communication device. The mobile communication device can then authenticate the application with the system entry proxy server instead of the developer station if needed, and the mobile communication device can only permit the application to have access to the level specified by the proxy server.

Figure 7:
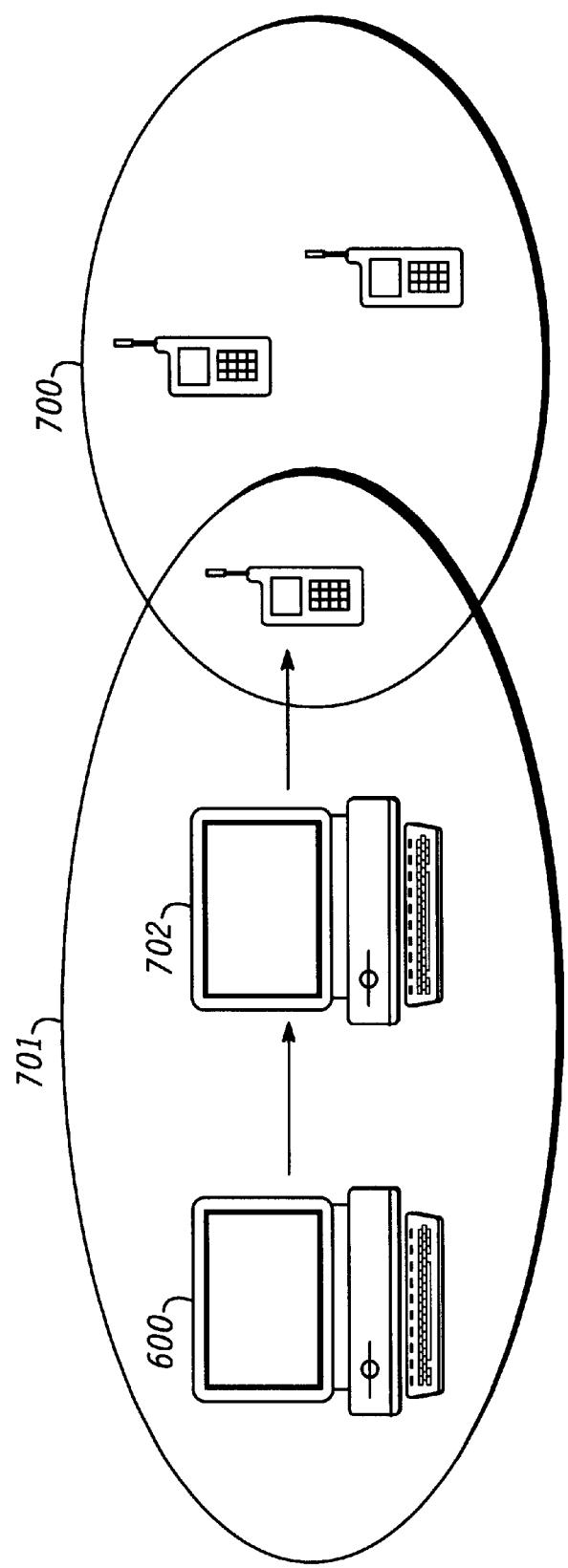
FIG. 7 is a system diagram of a corporate wireless system for performing re-certification for a wireless domain.

Referring now to FIG. 7, there is shown a system diagram of a corporate wireless system for performing re-certification for a wireless domain. There is provided an operator domain 700, a corporate domain 701. By corporate domain it is meant a security policy of an organization. It is used to preclude publicly available applications from accessing resources that are proprietary to the organization which reside on the mobile communication device, such as phone lists, for example. The operator domain here indicates a second security policy level dictated by the operator or service provider. This may be a security policy already set in the mobile communication device. The two domains are shown overlapping because the device, once it gets the application, examines both security policies, and only permits those setting that are approved by both policies. The method of re-certifying is a method for controlling the security setting of an application transferred into the wireless domain. Here the developer station may be operated by the same company or organization with which the users of the mobile communication devices in the wireless domain are associated. The mobile communication device is provided with a corporate root certificate corresponding to the corporate proxy server 702. In order to initiate the transfer of the application, the method starts by transmitting a request for the application from the mobile communication device to the developer station, through the corporate proxy server. The developer station responds by transmitting the application to the corporate proxy server, which commences authenticating the application and performing a validation of the byte code. The corporate server then re-certifies the application with a signed attribute certificate at the corporate proxy server, thereby providing a re-certified application. The signed attribute certificate specifies a desired level of security for the application. The corporate server then transmits the re-certified application the mobile communication device 606. Here, since the fleet of mobile communication devices all belong to the same organization, they can transfer the application to each other if so desired, as long as the attribute certificate is present.

Finally, a method of re-certifying an application for use in a mobile communication device is described. First, an application including an associated authentication means is provided at the developer station. The associated authentication means can be a digital certificate, for example. The other steps of transmitting a request for the application to the developer station from the mobile communication device; transmitting the application from the developer station to the system entry proxy server; and authenticating the application with the associated authentication means are performed as before. The system entry proxy server can also perform validating the application at the system entry proxy server with a validation tool. An archive such as a JAR file can be created at this time as well. The system entry proxy server has to determine a security level for the application. The criteria may be determined by the operator of a corporate domain to ensure that applications cannot access certain resources. For example, the system entry proxy can be directed to set the security level such that the application cannot access information in the mobile communication device such as a phone list. The proxy server then commences generating a compact certificate, including a security policy indicating the security level for the application, and transmitting the application and compact certificate to the mobile communication device.

The present invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the invention.

What is claimed is:

1. A method for validating an application for use in a mobile communication device, comprising:

receiving a request for the application from the mobile communication device at a system entry proxy server;

forwarding the request to a developer station, performed by the system entry proxy server;

receiving the application from the developer station at the system entry proxy server;

authenticating the application at the system entry-proxy server;

re-certifying the application with a compact certificate suitable for use in the mobile communication device, thereby producing a re-certified application; and forwarding the re-certified application to the mobile communication device.

2. A method for controlling a security setting of an application for execution in a mobile communication device, comprising:

providing a corporate root certificate in the mobile communication device;

providing a corporate domain including a developer station and a corporate proxy server;

transmitting a request for the application from the mobile communication device to the developer station, through the corporate proxy server;

transmitting the application to the corporate proxy server;

authenticating the application at the corporate proxy server;

re-certifying the application with a signed attribute certificate at the corporate proxy server, thereby providing a re-certified application, the signed attribute certificate specifying a desired level of security for the application; and transmitting the re-certified application the mobile communication device.

3. A method of re-certifying an application for use in a mobile communication device, comprising:

providing, at a developer station, the application including an associated authentication means;

providing a system entry proxy server which controls the entry of applications into a wireless domain in which the mobile communication device is operating;

providing a root certificate for the system entry proxy server in the mobile communication device;

transmitting a request for the application to the developer station from the mobile communication device;

transmitting the application from the developer station to the system entry proxy server;

authenticating the application with the associated authentication means;

validating the application at the system entry proxy server with a validation tool;

determining a security level for the application;

generating a compact certificate, including a security policy indicating the security level for the application; and transmitting the application and compact certificate to the mobile communication device.

* * * * *